United States Patent [19]

Butler

[11] 3,944,139
[45] Mar. 16, 1976

[54] MOISTURIZING APPARATUS FOR USE WITH WIND MACHINES

[75] Inventor: Donald E. Butler, Glendale, Calif.

[73] Assignee: SSP Agricultural Equipment, Inc., Burbank, Calif.

[22] Filed: Mar. 6, 1975

[21] Appl. No.: 555,857

[52] U.S. Cl. ............................... 239/77; 239/562
[51] Int. Cl.² .......................................... A01N 17/08
[58] Field of Search ........ 239/77, 78, 562, 563, 236

[56] References Cited
UNITED STATES PATENTS

| | | | |
|---|---|---|---|
| 1,998,856 | 4/1935 | Towt | 239/77 |
| 2,238,120 | 4/1941 | Launder | 239/77 |
| 2,630,324 | 3/1953 | Lay | 239/562 |
| 3,111,268 | 11/1963 | Butler | 239/563 |
| 3,550,863 | 12/1970 | McDermott | 239/562 |

*Primary Examiner*—Lloyd L. King
*Attorney, Agent, or Firm*—Huebner & Worrel

[57] ABSTRACT

A moisturizing apparatus for use with a wind machine including a fluid manifold mounted on the wind machine to dispense fluid in the path of an air stream created by a rotating fan blade on the wind machine to humidify hot dry air blown over agricultural crops. The apparatus includes valve means and valve control means to selectively activate the valve means from a normally closed position to an open position to allow fluid under pressure to pass through the manifold into the air stream.

9 Claims, 7 Drawing Figures

MOISTURIZING APPARATUS FOR USE WITH WIND MACHINES

BACKGROUND OF THE INVENTION

During the growing cycle of citrus trees and the formation of fruit buds unseasonable hot dry weather, particularly encountered in the southwestern part of the United States, will cause what is known as "June Drop." Because of the lack of sufficient water moisture in the air citrus buds will dry up and fall from the tree. The loss of such buds will at fruit maturity greatly diminish the yield.

Heretofore, very little, if anything, has been done to adeuqately prevent "June Drop" because the size of citrus orchards being large prevented any completely satisfactory moisturizing techniques. The only partial help to prevent this loss of buds has been by water sprinkler aeration means. This has required a great number of water sprinkler pipes to be placed vertically between rows of trees and of a height to extend above the trees whereby water may be mingled with the dry air for humidity. This, however, has not proved satisfactory for large acreage because of the tremendous number of such pipes that are needed. Further, with variances in water pressure it can not be assured that sufficient spray can be achieved to permeate the air over the trees in the orchard or grove. Finally, with the general lack of air movement during such weather conditions, the spray does little more than water a tree or few trees in the immediate vacinity of the sprinkler.

SUMMARY OF THE INVENTION

The present invention includes moisturizing apparatus which is adapted for use with conventional agricultural wind machines. At the present time many large citrus groves are equipped with a number of wind machines strategically placed around the grove for winter frost protection.

Generally the wind machines include a base set in the ground with a tower rising vertically therefrom to an elevation well above the trees. A power means is employed to rotate a fan blade at the top of the tower and air is drawn through the blade and spirally forced over the trees creating a disturbance of the ambient air preventing cold air to settle. In addition, the blade by gearing means is allowed to rotate 360° around the vertical axis of the tower so that a larger area of air turbulence is possible.

The object of this invention is to provide a moisturizing means which can be used in conjunction with such a wind machine to force water into the air stream and force water-ladened air over the citrus trees to humidify the hot dry air which causes "June Drop" of citrus buds.

More particularly the invention includes an annular water manifold secured atop the wind machine tower with a water supply means connected to the manifold. The manifold is formed with a series of upward pipe projections spaced around the manifold. Fitted to the projections are valves such as poppet valves that are normally biased closed. Mounted on the valves are nozzles or sprinkler heads to diffuse water passing through the valves into the air stream.

A further object of the invention is to provide cam means associated with the fan as it rotates around the vertical axis of the tower so that selected valves may be activated whereby water may be directed into the air stream. While all the valves could be opened simultaneously, it has been found that such practice creates an unnecessary waste of water. The caming arrangement may be adapted to any predetermined sequencing to achieve the most desirable valve opening so that an effective permeation of the air stream with water is achieved.

Another object of the invention is to utilize the manifold and air flow to distribute fluid pesticides through the manifold into the air stream whereby the pesticides will settle over the trees.

Further objects and advantages of the invention may be brought out in the following part of the specification wherein small details have been described for the competence of disclosure, without intending to limit the scope of the invention which is set forth in the appended claims.

DETAILED DESCRIPTION OF THE PREFERRED EMBODIMENTS

Figure 1:
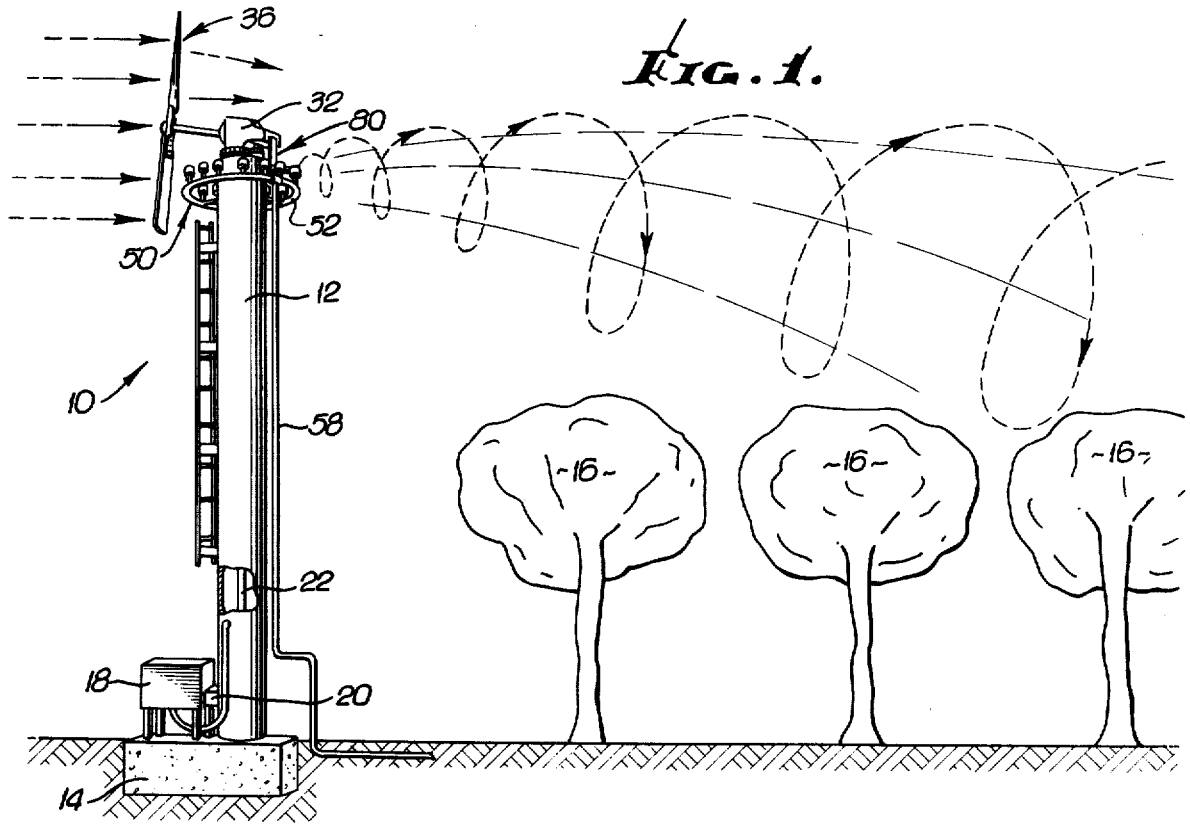
FIG. 1 is a side elevational view of a wind machine including the moisturizing apparatus of the present invention and the environment of its use.

Referring now to the drawings in more detail, in FIG. 1 there is illustrated a conventional wind machine generally designated 10 which includes a tower 12 in the form of a hollow column mounted on a base 14 within an orchard of trees 16.

Figure 3:
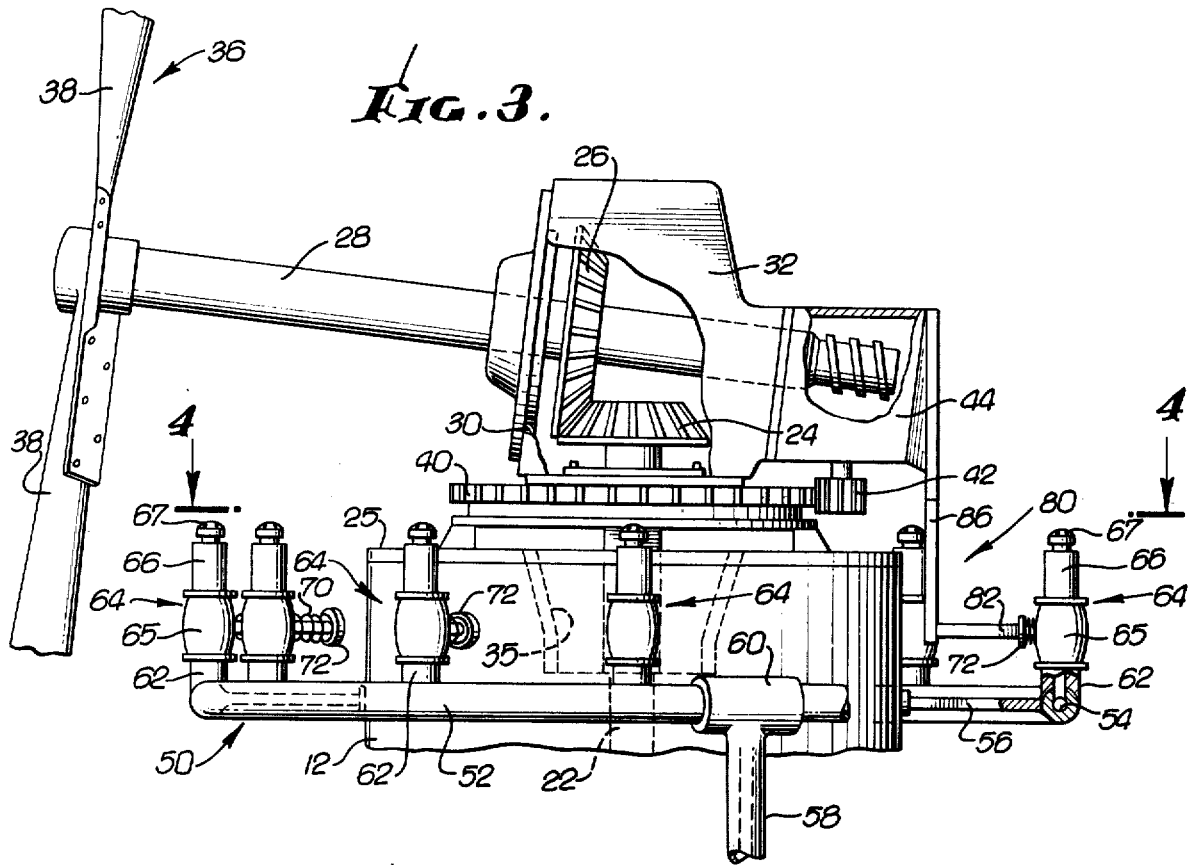
FIG. 3 is a side elevational view partly in section of the moisturizing apparatus and a wind machine illustrated in FIG. 1.

The power source 18 which may be an electric motor, gasoline or Diesel engine illustrated in this particular embodiment, is mounted adjacent to the base of the tower on the base 14 and through a reduction gear generally illustrated at 20, is coupled to the lower part of a vertical drive shaft 22, best seen in FIG. 3 mounted within the tower 12. The vertical drive shaft 22 extends upwardly through the hollow tower 12 and bushing (not illustrated) and terminates in a bevel gear 24 above the top 25 of the tower 12.

Meshed with the bevel gear 24 is a second bevel gear 26 which in turn is mounted on a fan blade shaft 28. The fan blade shaft 28 is journaled through the front wall 30 of a gear housing 32 which covers a portion of the fan blade shaft 28 and the respective bevel gears 24 and 26. The housing 32 is rotatably mounted within a gear assembly cavity 35 (partially illustrated in dotted lines) which extends from top 25 into the hollow tower 12 and surrounds the vertical drive shaft 22 whereby the housing 32 and fan 36 will rotate 360° around the vertical axis of the tower 12.

Mounted at the forward end of the fan blade shaft 28 is a fan blade generally designated 36. As can be seen, when the vertical shaft 22 rotates, movement is imparted through the bevel gears 24 and 26 to the fan drive shaft 28 in turn rotating the fan 36. Due to the pitch of the blades 38 of the fan 36, air is drawn through the blades 38 and expelled rearwardly as shown by the arrows in FIG. 1.

There is also provided a ring gear 40 which is fixedly mounted on the gear assembly cavity 35 at the top of the tower 26. Meshed with the ring gear 40 is a drive spur reduction gear 42 which in turn extends downwardly from reduction gearing (not fully illustrated) in a housing extension 44. Thus rotation of fan shaft 28 will also impart 360° rotation of the fan 36 and housing 32 around the vertical axis of tower 12.

The moisturizing apparatus generally designated 50 includes an annular manifold 52 preferably formed of pipe and having a bore 54. The manifold 52 preferably completely encircles the tower 12. In order to mount the manifold 52 to the tower 12, a plurality of support struts 56 extend outwardly from the tower 12 and are welded or otherwise secured to the inner surface 57 of the manifold 52. As can be seen from the drawings the manifold 52 is preferably mounted slightly below the top 25 of the tower 12 and on a horizontal plane when viewing it from the side.

In order to bring fluid or water to the manifold 52 a supply line 58 is preferably provided which extends from the ground, up the side of the tower, terminating in a T-joint 60 in the manifold 52, so that water will flow into the bore 54.

Positioned at spaced intervals around the manifold 52 and extending upwardly therefrom are a plurality of pipe nipples 62 which communicate with the bore 54. Preferably secured to each of the nipples 62 are valve means 64 such as a conventional poppet valve 65. Extending from the valves 65 are nozzles or sprinkler heads 66 having exit orifices 67 of any general configuration whereby water which exits through the orifices 67 may be dispersed in a relatively fine spray.

Each of the valves 65 include a plunger 68 and a tension spring 70 mounted between the valve and a cam follower 72 on the end of the plunger 68 so as to normally bias the valve 65 in a closed position.

Figure 2:
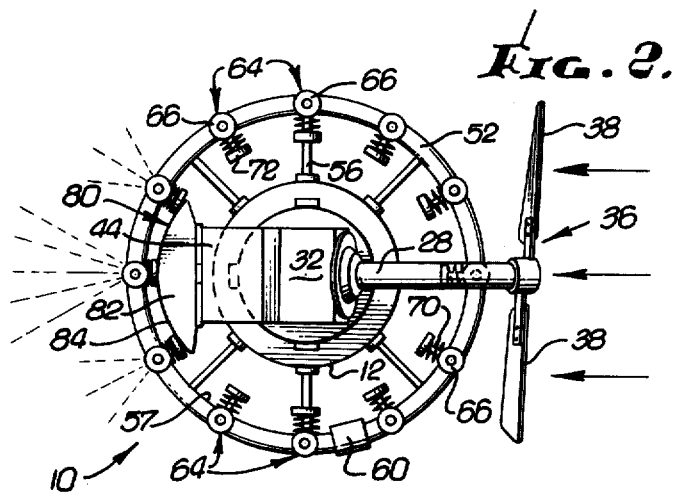
FIG. 2 is a top plan view of the moisturizing apparatus mounted to a wind machine illustrating cam actuated valves and nozzles with water being expelled therefrom.
Figure 5:
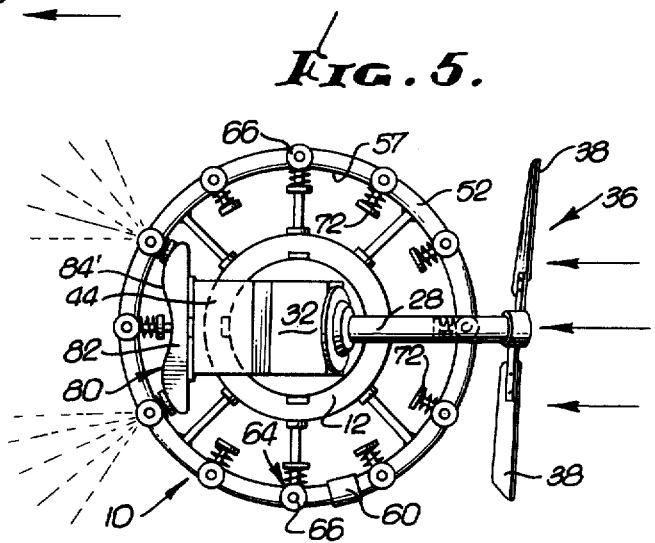
FIG. 5 is a top plan view of the moisturizing apparatus such as illustrated in FIG. 2 with a modified cam arrangement for actuating the valves.
Figure 4:
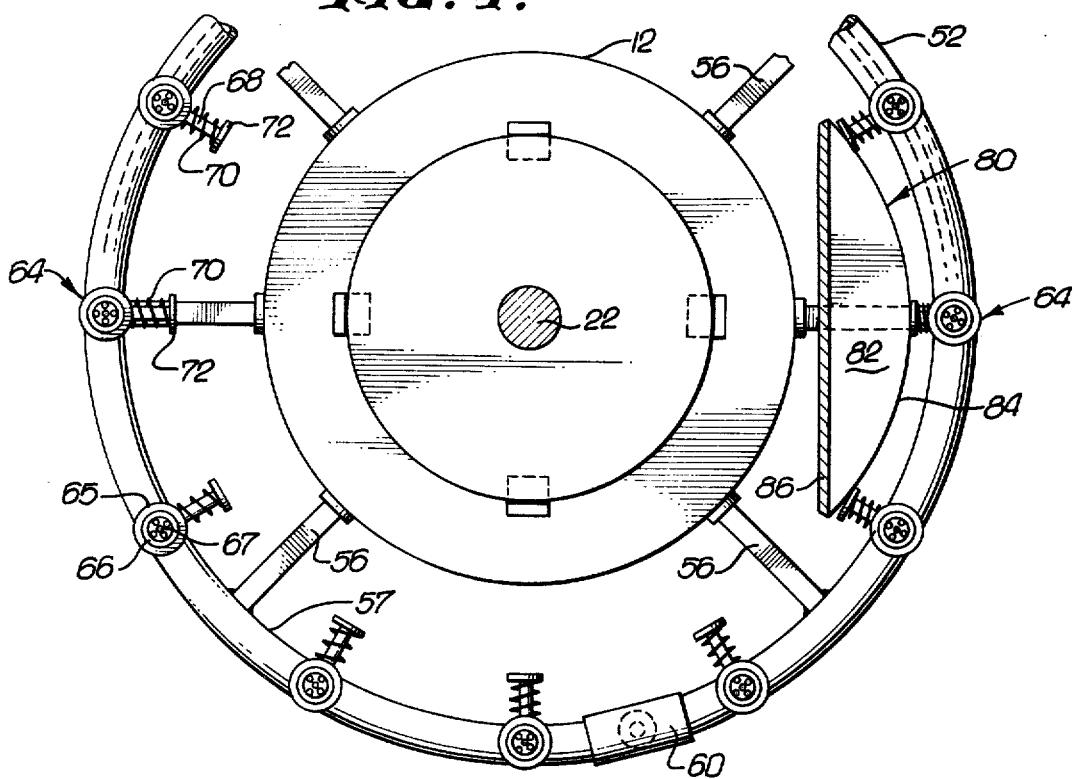
FIG. 4 is a top elevational view partly in section taken on line 4—4 of FIG. 3.
Figure 6:
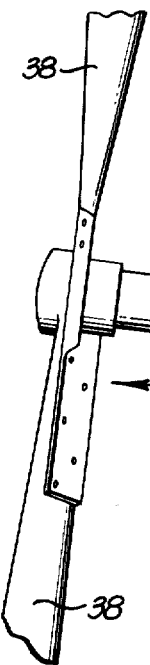
FIG. 6 is a side elevational view similar to FIG. 3 showing a modified form of mounting the valves and cam actuating means for the moisturizing apparatus.
Figure 6:
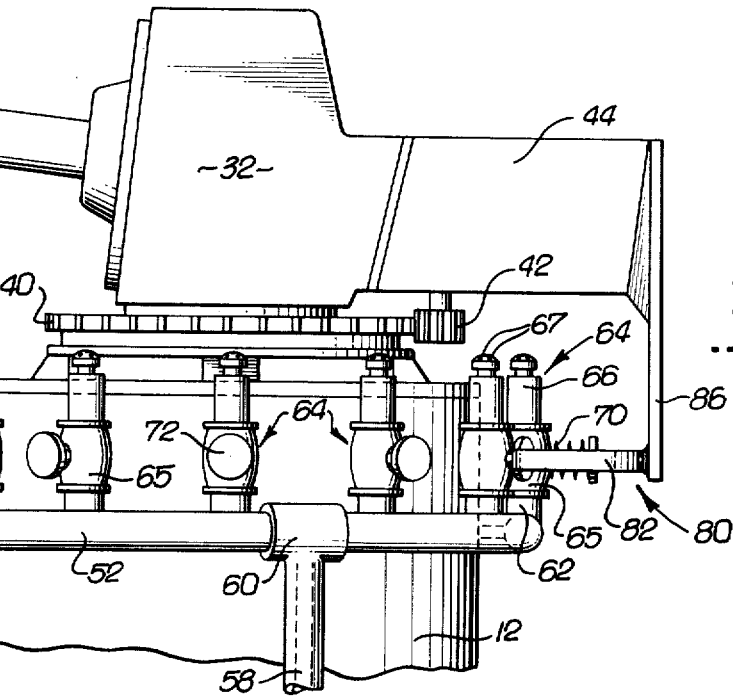
Figure 6:
Figure 7:
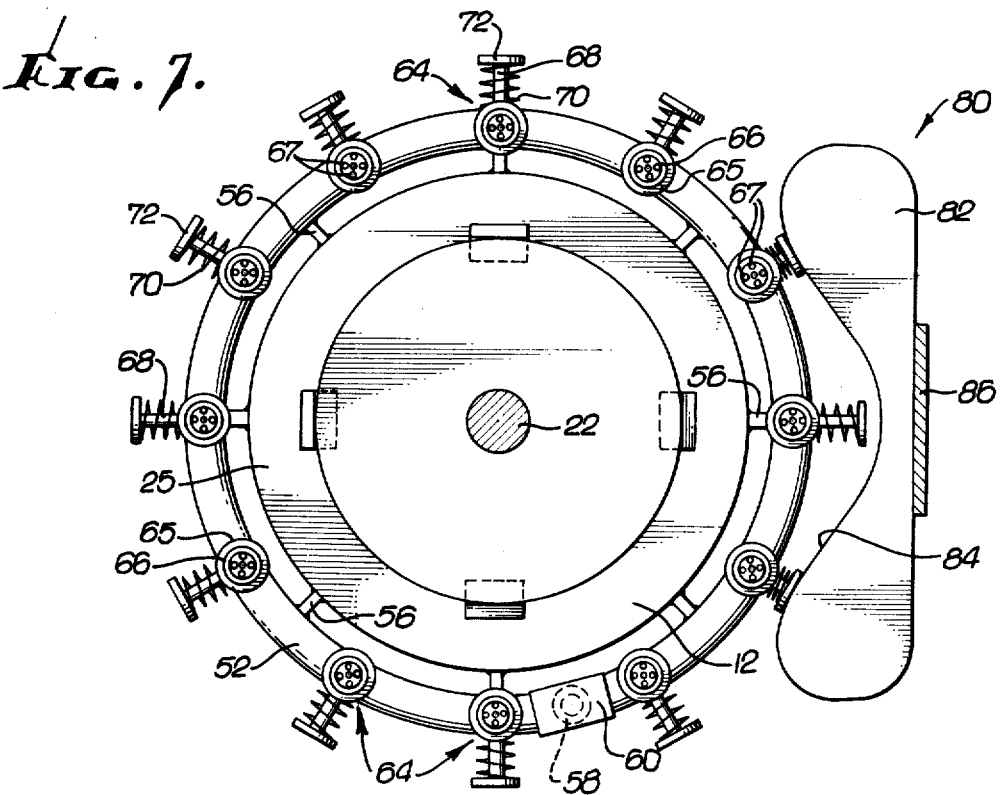
FIG. 7 is a top elevational view partly in section taken on line 7—7 of FIG. 6.
Figure 7:

In order to actuate the valves 65 whereby they may be opened and water allowed to pass through the nozzles 66, valve control or camming means 80 such as illustrated in FIGS. 2, 4 and 5 is provided. This camming means 80 preferably includes a cam 82 having a flank or cam profile 84. The cam 82 in turn is secured to a downwardly extending cam plate 86 depending from the housing extension 44.

Thus, in operation, as the housing 32, extension 44 and fan 36 rotate about the vertical axis of the tower 12, the cam plate 86 and cam 82 will also rotate 360° around the tower 12. Because of the profile 84 of the cam and being on the same horizontal plane as the followers 72, it will engage the cam followers 72 of one or more of the valves 65 depressing the plungers 68 which in turn will open the valve allowing water within the manifold 52 to exit from the nozzles 66 as is illustrated in FIGS. 2 and 5.

As can be seen in the drawings, the camming means 80 is preferably diametrically opposite the fan 36. In this way air which is drawn in through the blades 36, passes over the housing 32 and fluid passing out of the nozzles 66 will be picked up by the swirling air stream and distributed rearwardly as best seen by the arrows and dotted lines in FIG. 1, carrying the moisture laden air over and around the trees 16 in the orchard to effect a humidifying of the hot dry air and prevent the unwanted "June Drop" of citrus fruit buds.

As the housing 32 and extension 44 continue to rotate around the vertical axis of the tower 12, the cam profile 84 will engage successive cam followers 72 of valves 65 and in turn as it disengages the cam followers 72 the springs 70 will return the plunger 68 to a normally closed position whereby the valve 65 will prevent moisture from exiting through the nozzles 66.

FIG. 5 illustrates one modified form of cam 82 wherein the cam profile 84' in the central portion between the respective ends is curved inwardly so that while the overall length of the cam 82 would be sufficient in this illustration to engage and activate three valves 65, the curved central portion is spaced inwardly from the plunger 68 whereby only two of the valve cam followers 72 on either side of a center valve 65 are depressed to allow fluid to exit and pass into the air stream for moisturizing of the air.

FIGS. 6 and 7 illustrate a further modified form of the moisturizing apparatus 50 wherein the manifold 52 is of a lesser diameter than that illustrated in FIGS. 2 and 5 and is mounted relatively close to the tower 12 so that there can be a more concentrated flow of water exiting from the nozzles 66. In this particular modification the struts 56 are reduced in length from those illustrated in FIGS. 2 through 5. In order to activate the valves 65 it will be noted that the valves are reversed whereby the plungers 68 and cam followers 72 extend radially upward from the manifold 52. In this position the cam 82 is mounted on the outside of the manifold 52 by means of cam plate 86 extending downwardly from an elongated housing extension 44. The profile or flank 84 of the cam 82 may be as illustrated in FIG. 5 or may be of the uninterrupted curved type such as viewed in FIGS. 2 and 4 whereby a number of adjacent valves 65 one to the other may be actuated simultaneously.

While the invention is particularly adapted to moisturize dry hot air with water to prevent "June Drop" of citrus buds, it should be noted that the moisturizing means 50 may also be adapted for dispersing fluid pesticides through the supply line 58 into the manifold 52 and into the stream of air created by the fan 36 so as to allow the pesticide to settle on the trees 16.

Additionally, while the manifold 52 is illustrated and described as extending around the entire tower 12 and has nozzles 66 therearound, it should be noted that the manifold does not have to extend around the entire circumference of the tower, nor do the nozzles 66 have to be positioned around an entire manifold for the apparatus to function.

With a plurality of conventional wind machines 10 positioned within the citrus orchard whereby each of the fans 36 are adapted to rotate 360° around the vertical axis, the attachment of the moisturizing means 50 to existing wind machines or to new machines strategically positioned within an orchard it can be assured that the orchard during dry hot weather, such as encountered in the southwestern part of the United States, may be permeated with moisture to be dispersed over the grove and humidify the air preventing the buds on the trees 16 from becoming dried out and falling from the tree.

Although I have herein shown and described my invention in what I have conceived to be the most practice and preferred embodiment, it is recognized that departures may be made therefrom within the scope of my invention.

I claim:

1. The combination of a wind machine and air moisturizing means adapted for use on agricultural crops, said combination including a hollow vertical tower mounted on the ground; a rotatable fan mounted at the top of said tower for creating an air stream horizontally over the crops; power means coupled to said fan; gearing means on said tower and coupled with said power means for rotating said fan 360° around the vertical axis of said tower; a fluid manifold on said tower; fluid supply means connected to said manifold; fluid nozzles on said manifold and in communication therewith to direct fluid upward into said air stream; said nozzles including normally closed valve means spaced between said manifold and said nozzle to control fluid flow from said manifold through said nozzles; camming means linked with said fan and rotatably engaging said valve means momentarily biasing said valve means open to release fluid through said nozzles; wherein each of said normally closed valve means includes a plunger extending radially from said valve and a cam follower at the end thereof remote said valve, and a spring biasing said plunger radially outward whereby said valve is closed.

2. The combination of claim 1 wherein said cam means includes a cam having a profile engageable with said cam follower for depressing said plunger and opening said valve.

3. The combination of claim 1 wherein said cam profile is of such a curved configuration to simultaneously engage a plurality of said cam followers.

4. The combination of claim 1 wherein said plunger extends radially inward toward said tower and said camming means is positioned between said tower and said plunger.

5. The combination of claim 1 wherein said plunger extends radially outward away from said tower and said camming means is positioned outwardly of said plungers.

6. A moisturizing apparatus to humidify air for use with an agricultural wind machine wherein said machine includes a vertical tower mounted on the ground; power means mounted on the ground adjacent the tower and connected to a vertical drive shaft journaled within the vertical tower and extending upwardly through the top of said vertical tower; a fan journaled on a fan shaft atop the tower and gear means interconnecting said drive shaft and said fan shaft whereby rotation of said fan to create an air stream horizontally over agricultural crops may be effected; a gear housing surrounding said gear means; said housing, said fan shaft and said fan rotatable 360° around the vertical axis of said tower through said drive shaft; said moisturizing apparatus including an annular fluid manifold extending circumferentially around said tower and secured to said tower adjacent the top thereof; fluid supply means connected to said manifold; nozzles on said manifold and in fluid communication therewith to direct fluid upward into said air stream; valve means associated with said nozzles to control fluid flow from said manifold through said nozzles wherein said valve means each includes a normally closed valve, a plunger extending radially from said valve and a cam follower at the end thereof remote from said valve, and spring means biasing said plunger radially outward whereby said valve is closed.

7. A moisturizing apparatus of claim 6 wherein said valve control means includes a cam having a profile adapted to engage and depress a cam follower to open a valve and permit fluid to flow from said manifold through a nozzle into said air stream, said cam being connected to said gear housing whereby rotation of said housing 360° around the vertical axis of said tower will rotate said cam and sequentially temporarily open each of said valves.

8. A moisturizing apparatus of claim 6 wherein said cam is mounted diametrically opposite said fan whereby nozzles generally diametrically opposite said fan will be activated in line with the air stream created by said fan.

9. A moisturizing apparatus of claim 6 wherein said cam includes a profile which will engage at least two valve cam followers simultaneously and open said valves to allow fluid to flow through at least two nozzles.

* * * * *